United States Patent

Marshall et al.

[11] Patent Number: 5,876,126
[45] Date of Patent: Mar. 2, 1999

[54] BEARING GUIDED LABYRINTH

[75] Inventors: George Marshall, Portland; Richard Harrison, Aurora, both of Oreg.

[73] Assignee: SAE Magnetics (H.K.) Ltd., A Hong Kong Corp., San Jose, Calif.

[21] Appl. No.: 928,184

[22] Filed: Sep. 12, 1997

[51] Int. Cl.$^6$ ................................................. F16C 33/80
[52] U.S. Cl. ........................................................ 384/480
[58] Field of Search .................................... 384/144, 480, 384/537, 585, 477

[56] References Cited

U.S. PATENT DOCUMENTS 5,536,088  7/1996  Cheever et al. .................. 384/107
5,714,817  2/1998  Norris ............................. 384/144

*Primary Examiner*—Lenard A. Footland
*Attorney, Agent, or Firm*—Chernoff, Vilhauer, McClung & Stenzel, LLP

[57] ABSTRACT

A motor incorporating a bearing guided labyrinth system of the present invention includes a shaft, a hub, a bearing assembly, and a bearing guided labyrinth. The bearing assembly includes an inner bearing ring and an outer bearing ring separated by a plurality of ball bearings. The inner bearing ring has an inner annular ring surface and the outer bearing ring has an outer annular ring surface. The bearing guided labyrinth has an inner prong and an outer prong. The inner prong is at least partially positionable between the inner ring surface and the shaft. The outer prong is at least partially positionable between the outer ring surface and the hub. The outer prong grips the bearing assembly and specifically the outer annular ring surface of the outer bearing ring.

12 Claims, 3 Drawing Sheets

BEARING GUIDED LABYRINTH

BACKGROUND OF THE INVENTION

The following invention relates to a bearing guided labyrinth for use in electronic spindle motors having ball bearing rings.

Known electric spindle motors of the type used in disk drives conventionally use ball bearing assemblies to facilitate movement between a rotary member and a stationary member. Ball bearing assemblies generally include metallic or ceramic ball bearings which are positioned between an inner bearing ring and an outer bearing ring. Bearing rings may be either inner or outer rotators depending on whether the hub or shaft rotates. Inner rotators have an inner bearing ring that rotates, and outer rotators have an outer bearing ring that rotates. The ball bearings are preferably evenly spaced within the inner and outer bearing rings. The ball bearings are generally held in this evenly spaced position by teeth of a ball bearing cage (not shown).

Bearing lubricant fluid is used in bearing assemblies to encourage free movement of the ball bearings, the inner bearing ring, and the outer bearing ring. Conventionally, the lubricant is initially deposited on the teeth of the bearing cage. During use, however, the lubricant tends to migrate and eventually escapes the bearing ring. The lubricant that migrates and escapes the bearing ring often enters the interior of the motor or exits the motor completely.

One cause of lubricant migration is the rotation of the bearing assembly and centrifugal pull that causes the lubricant to be thrown from the bearing assembly. Although lubricant generally is not thrown from a bearing assembly at lower rotation speeds, higher rotation speeds tend to disperse or "sling out" lubricant. At particularly high speeds the lubrication is atomized.

Another cause of lubricant migration is airflow through the motor and bearing assemblies which tends to push lubricant, particularly atomized lubricant, out of the bearing assembly. Airflow also tends to carry particles and contaminants. Designers of motors try to reduce airflow to reduce or eliminate these problems. The use of bearing shields reduces the flow of air and contaminants through the bearing assembly and thereby partially inhibits the loss of lubricant from the bearing assembly.

Once the lubricant escapes the bearing assembly it enters the horizontal gap between the top surface of the ball bearing assembly and the bottom surface of the washer (or other enclosing apparatus). The lubricant then travels from the horizontal gap up through the vertical air gap between the inner surface of the washer and the smooth outer surface of the shaft. The lubricant then can escape the motor.

Using fluid labyrinths to prevent lubrication fluid from escaping a fluid bearing spindle motor is shown in U.S. Pat. No. 5,536,088 which is assigned to the same assignee as the present application, the disclosure of which is hereby incorporated by reference. Fluid labyrinths found in such fluid bearing spindle motors are generally the winding path in which the lubrication fluid resides, at least part of which forms the fluid bearings. Fluid labyrinths are not used with ball bearing spindle motors because the lubrication fluid is not intended as a bearing but instead is used to facilitate rotation between the ball bearings and the inner and outer bearing rings. Accordingly, the lubrication fluid is not intended to enter the air gaps.

FIG. 1 shows a labyrinth seal system shown in U.S. patent application Ser. No. 08/712,615 which is assigned to the same assignee as the present application, the disclosure of which is hereby incorporated by reference. The shown motor incorporates a labyrinth seal system that includes at least one rotating member (either a hub 26 or a shaft 28) that rotates in relation to another member (either the shaft 28 or the hub 26). The rotating member is separated from the other member by a ball bearing assembly 18 that has an inner bearing ring 22 and an outer bearing ring 24 separated by a plurality of ball bearings 20. A labyrinth seal washer 40 having an annular leg 42 positioned at least partially between the outer surface of the shaft 28 and the inner surface of the inner bearing ring 22.

None of the prior art has found a solution that completely prevents oil from migrating out of a motor.

SUMMARY OF THE PRESENT INVENTION

The present invention is directed to a bearing guided labyrinth that substantially prevents lubricant from escaping a motor. The bearing guided labyrinth of the present invention significantly restricts airflow through the motor which reduces the flow of particles (particularly lubricant particles) out of the bearings.

A motor incorporating the bearing guided labyrinth system of the present invention includes a shaft, a hub, a bearing assembly, and a bearing guided labyrinth. The bearing assembly includes an inner bearing ring and an outer bearing ring separated by a plurality of ball bearings. The inner bearing ring has an inner annular ring surface facing the shaft and the outer bearing ring has an outer annular ring surface facing the hub. The bearing guided labyrinth has an inner prong and an outer prong. The inner prong is at least partially positionable between the inner ring surface and the shaft. The outer prong is at least partially positionable between the outer ring surface and the hub. The outer prong grips the bearing assembly and specifically it grips the outer annular ring surface of the outer bearing ring.

The shaft may have a first shaft outer circumference and a second shaft outer circumference. Similarly, the hub may have a first hub inner circumference and a second hub inner circumference. The inner prong is at least partially positionable between the inner ring surface and the first shaft circumference, and the outer prong is at least partially positionable between the outer ring surface and the first hub circumference.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
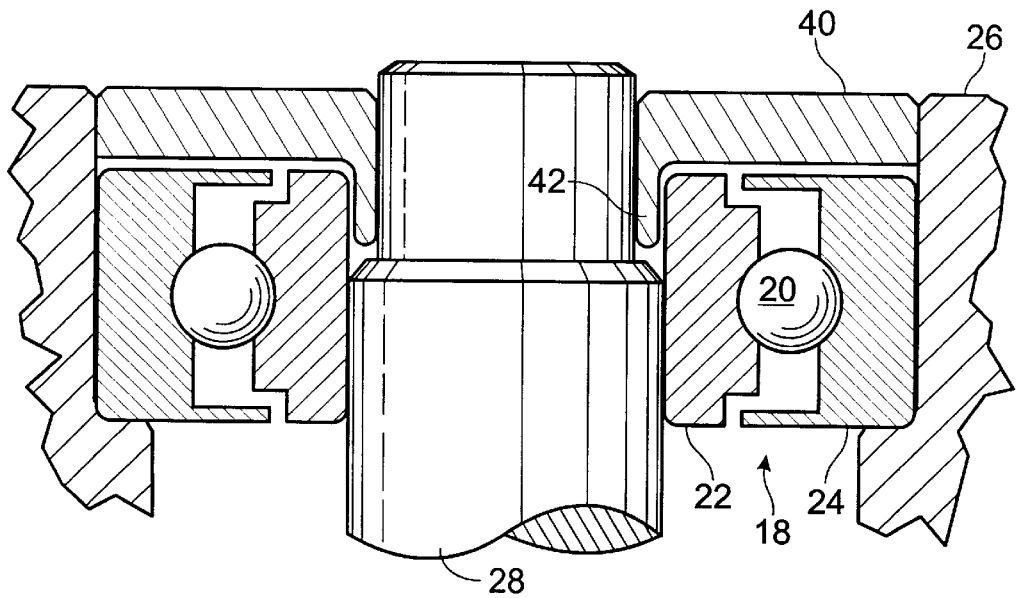
FIG. 1 is a partial side sectional view of a known ball bearing with a labyrinth seal system.

Similar to prior art motors, the present invention includes a ball bearing assembly 18 having an inner bearing ring 22 and an outer bearing ring 24 separated by a plurality of ball bearings 20. The inner bearing ring 22 has an inner ring surface 44 that faces and is substantially adjacent the shaft 28. The outer bearing ring 24 has an outer ring surface 46 that faces and is substantially adjacent the hub 26. Because the inner bearing ring 22 and the outer bearing ring 24 can rotate freely relative to each other, either the shaft 28 or the hub 26 can rotate depending on the design of the motor.

Figure 2:
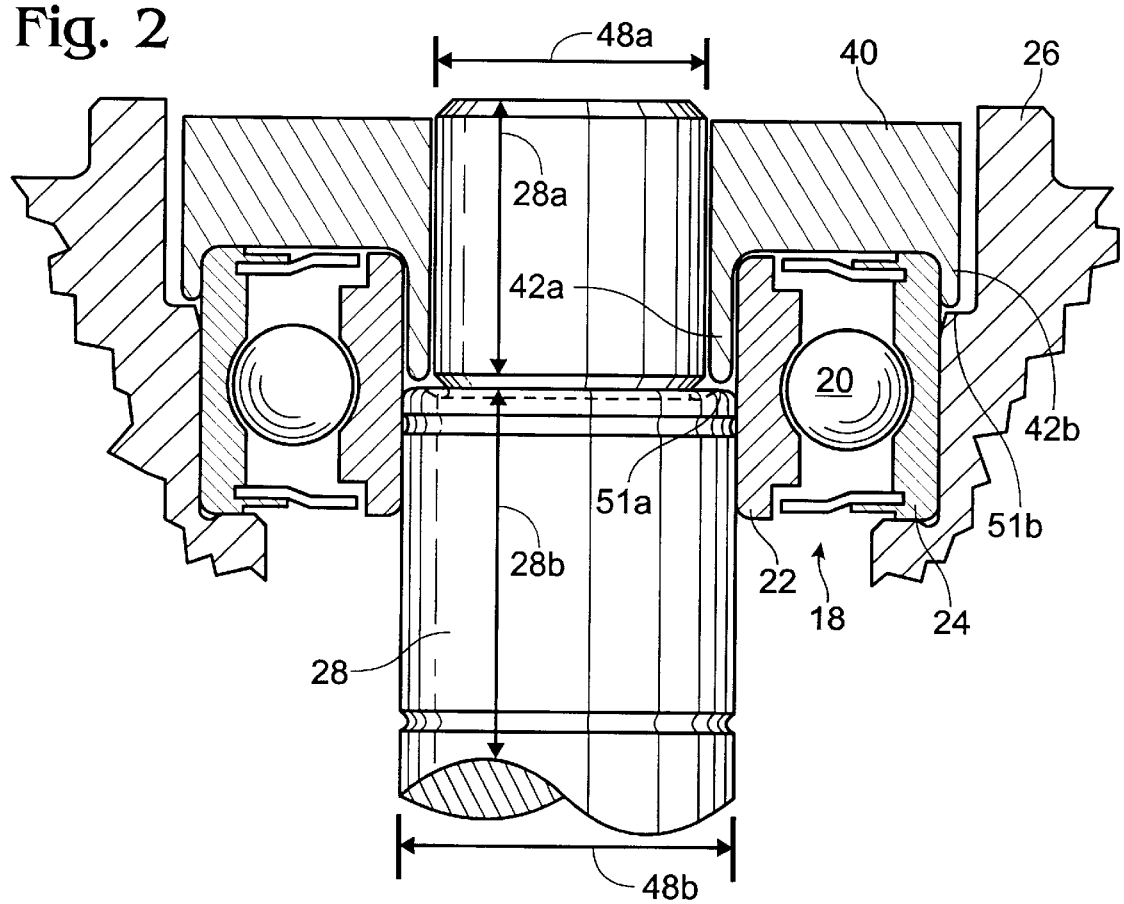
FIG. 2 is a partial side sectional view of a ball bearing ring and bearing guided labyrinth of the present invention.
Figure 3:
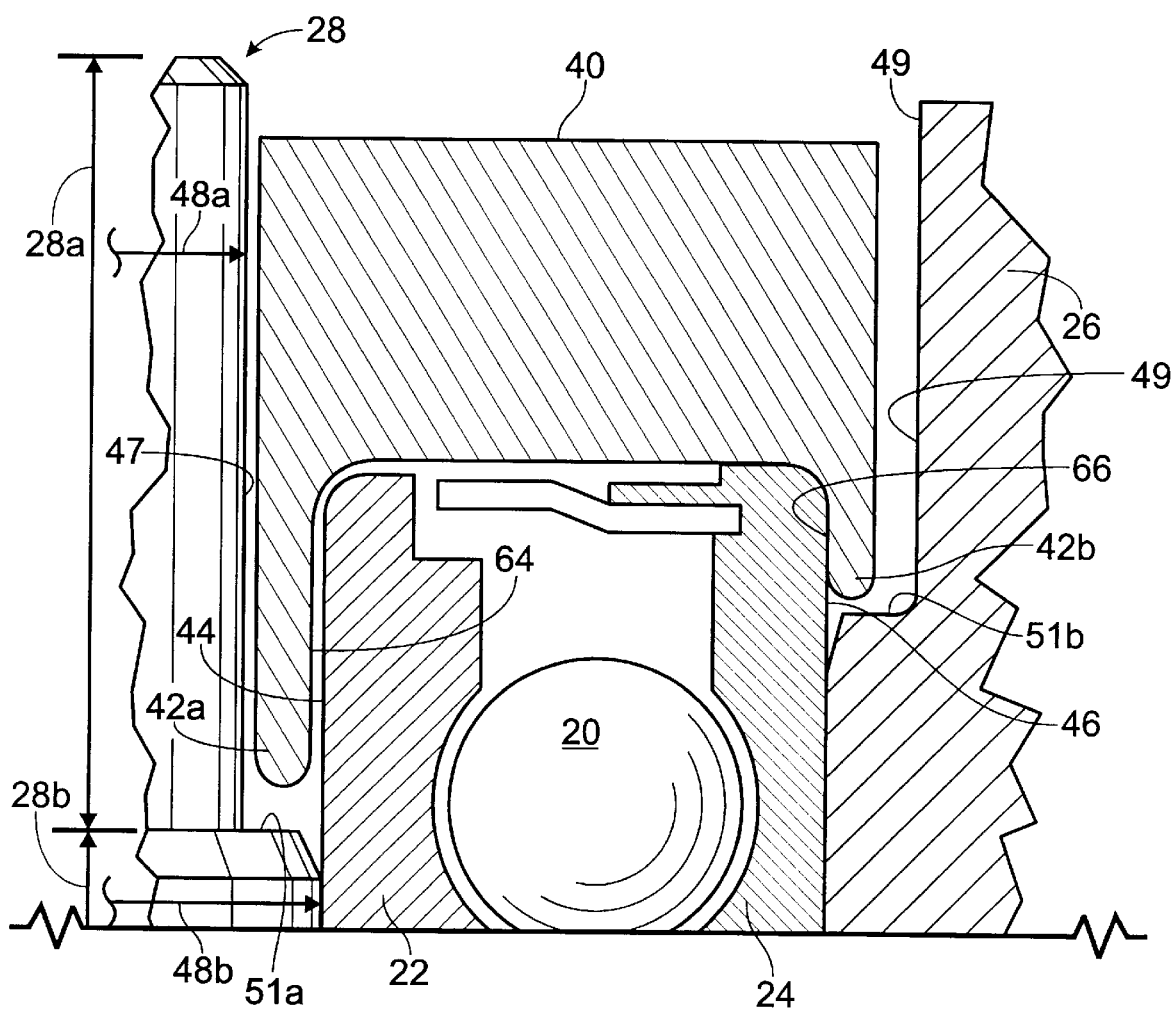
FIG. 3 is an expanded side sectional view of one embodiment of a bearing guided labyrinth of the present invention.

As shown in FIGS. 2 and 3, the present invention includes a bearing guided labyrinth (BGL) 40 having an inner annular prong 42a and an outer annular prong 42b. Inner prong 42a projects downward and, when in position, is situated in an annular relationship between the shaft 28 and the inner bearing ring 22. Outer prong 42b projects downward (or in the same direction as prong 42a) and, when in position, is situated in an annular relationship between the hub 26 and the outer bearing ring 24. This embodiment of the invention achieves an extremely tight radial gap based on the mechanical design and placement of the BGL 40. Specifically, the outer prong 42b is press fit so as to grip the outer diameter of outer bearing ring 24.

As shown, inner prong 42a of the BGL 40 is positioned at least partially between the outer surface 47 of the shaft 28 and the inner ring surface 44 of the inner bearing ring 22. Also, outer prong 42b of the BGL 40 is positioned at least partially between the inner surface 49 of the hub 26 and the outer ring surface 46 of the outer bearing ring 24. As shown, there is no gap between the outer prong 42b and the outer ring surface 46.

To accommodate the inner prong 42a between the shaft 28 and the inner bearing ring 22 and to accommodate outer prong 42b between the hub 26 and the outer bearing ring 24, prong spaces partially therebetween had to be created. In the embodiment shown in FIGS. 2 and 3, the necessary prong spaces are created by providing annular notches in the shaft 28 and hub 26 to accommodate the prongs 42a and 42b of the BGL 40. More specifically, in this embodiment, the shaft 28 has a first shaft portion 28a with a first shaft diameter 48a and a second shaft portion 28b with a second shaft diameter 48b. The first shaft diameter 48a is narrower than the second shaft diameter 48b. In this manner, the first shaft portion 28a is narrower than the second shaft portion 28b. The short shaft jog or step 51a between the first shaft portion 28a and the second shaft portion 28b appears as a shoulder. Similarly, prong 42b may be accommodated, as shown, by providing a short hub jog or step 51b in the hub 26, as shown, so that the hub 26 has what appears to be a shoulder. The prong spaces created by the steps 51a, 51b provide the space necessary to accommodate the prongs 42a, 42b.

Figure 4:
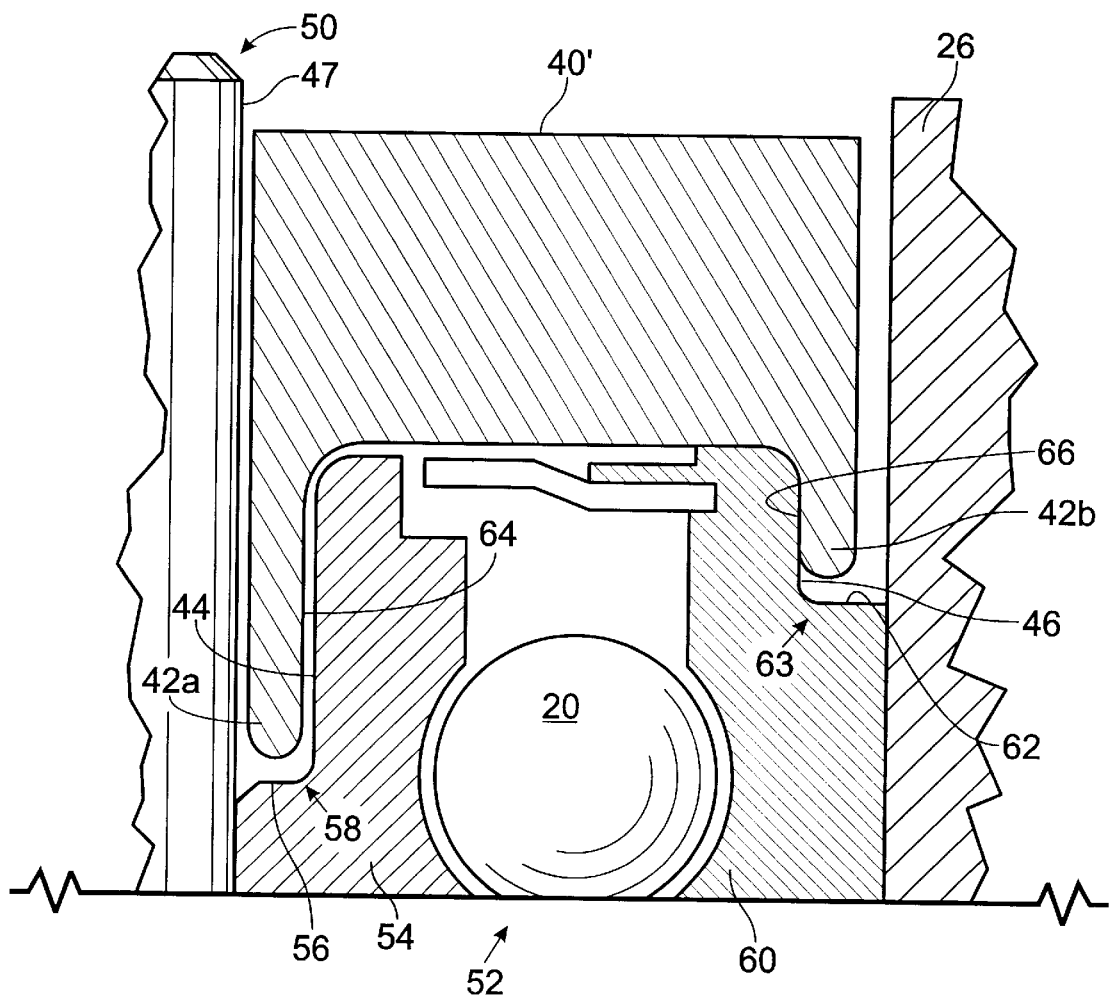
FIG. 4 is an alternate embodiment of a bearing guided labyrinth of the present invention.

FIG. 4 shows an alternate embodiment that includes a straight shaft 50, a modified ball bearing assembly 52, and a BGL 40'. The BGL 40' is substantially identical to the BGL 40, but may be narrower. The modified bearing assembly 52 is substantially identical to standard ball bearing assemblies 18 except that it has a modified inner bearing ring 54 that has an annular inner step 56 in a corner 58 and a modified outer bearing ring 60 that has an annular outer step 62 in a corner 63. The annular steps 56, 62 accommodate the inner and outer prongs 42a and 42b, respectively.

The BGL 40, 40' is press fit onto the bearing assembly 18, 52 and held in place by the outer prong 42b gripping the outer bearing ring 24, 60. This press fit connection leaves no space between the inner prong surface 66 of the outer prong 42b and the outer ring surface 46 of the outer bearing ring 24, 60.

The prong 42b is used to guide the BGL 40, 40' into place. Because of the tight fit of the BGL 40, there is only one correct position in which it will fit. This eliminates the necessity for multiple adjustments. Also, preferably there is an extremely small gap between surfaces 44 and 64 that restricts airflow, the advantages of which are described above.

It should be noted that shown bearing rings 18 and 52 are meant to be exemplary. In alternate embodiments the bearing ring may include no shields, one shield, or two shields. The shields may be integral, as shown, or may be external such as the shields shown in U.S. patent application Ser. No. 08/581,058 which is assigned to the same assignee as the present application, the disclosure of which is hereby incorporated by reference.

It should be noted that in an alternate embodiment (not shown) the BGL 40, 40' would grip the bearing assembly 18, 52 only from the inside. Specifically, the inner annular prong 42a would grip the inner bearing ring 22. In this embodiment there would be no gap between the inner ring surface 44 and the inner prong surface 64 of the inner annular prong 42a.

Finally, it should be noted that the bearing lubricant may be any lubricant such as oil. Preferably, the lubricant includes a rust inhibiting agent. Further, the lubricant may be a combination of a base and grease.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. In a motor having at least one rotating member, a bearing guided labyrinth system comprising:

(a) a bearing assembly including an inner bearing ring and an outer bearing ring separated by a plurality of ball bearings, said inner bearing ring having an inner annular ring surface and said outer bearing ring having an outer annular ring surface;

(b) a shaft having a first shaft outer circumference and a second shaft outer circumference;

(c) a hub having a first hub inner circumference and a second hub inner circumference; and (d) a bearing guided labyrinth having an inner prong and an outer prong, said inner prong at least partially positionable between said inner ring surface and said first shaft circumference, said outer prong at least partially positionable between said outer ring surface and said first hub circumference.

2. The system of claim 1 wherein said outer prong grips said bearing assembly ring.

3. The system of claim 1 wherein said outer prong grips said outer annular ring surface.

4. The system of claim 1 wherein said bearing guided labyrinth is press fitable.

5. The system of claim 1 wherein said bearing guided labyrinth restricts air flow.

6. The system of claim 1 wherein said first and second shaft circumferences are equal.

7. The system of claim 1 wherein said first and second hub circumferences are equal.

8. The system of claim 1 wherein said first shaft circumference has a first shaft diameter and said second shaft circumference has a second shaft diameter, said first shaft diameter being narrower than said second shaft diameter.

9. The system of claim 1 wherein said first hub circumference has a first hub diameter and said second hub circumference has a second hub diameter, said first hub diameter being wider than said second hub diameter.

10. The system of claim 1 further comprising:
   (a) said inner bearing ring having a first inner bearing circumference with a first inner bearing diameter above a second inner bearing circumference with a second inner bearing diameter;
   (b) said outer bearing ring having a first outer bearing circumference with a first outer bearing circumference above a second outer bearing circumference with a second outer bearing diameter; and
   (c) said first inner bearing diameter being wider than said second inner bearing diameter and said first outer bearing diameter being narrower than said second outer bearing diameter.

11. A bearing guided labyrinth system comprising:
   (a) a shaft having an outer annular shafts surface,.
   (b) a hub having an inner annular hub surface;
   (c) a bearing assembly surrounding said shaft, said bearing assembly having an inner annular ring surface at least partially adjacent said outer shaft surface;
   (d) a bearing guided labyrinth having an annular washer surface and inner and outer annular prongs, said inner and outer annular prongs perpendicular said annular washer surface; and
   (e) said inner annular prong at least partially between said outer shaft surface and said inner ring surface, and said outer annular prong at least partially between said inner hub surface and said outer ring surface.

12. In a motor having a shaft and a hub, a bearing guided labyrinth system comprising:
   (a) a bearing assembly including an inner bearing ring and an outer bearing ring separated by a plurality of ball bearings, said inner bearing ring having an inner annular ring surface and said outer bearing ring having an outer annular ring surface; and
   (b) a bearing guided labyrinth having an inner prong and an outer prong, said inner prong at least partially positionable between said inner ring surface and said shaft, said outer prong at least partially positionable between said outer ring surface and said hub.

* * * * *